May 5, 1925.
S. SYMONDS
ROTARY VALVE
Filed Oct. 29, 1924
1,536,733
2 Sheets-Sheet 1
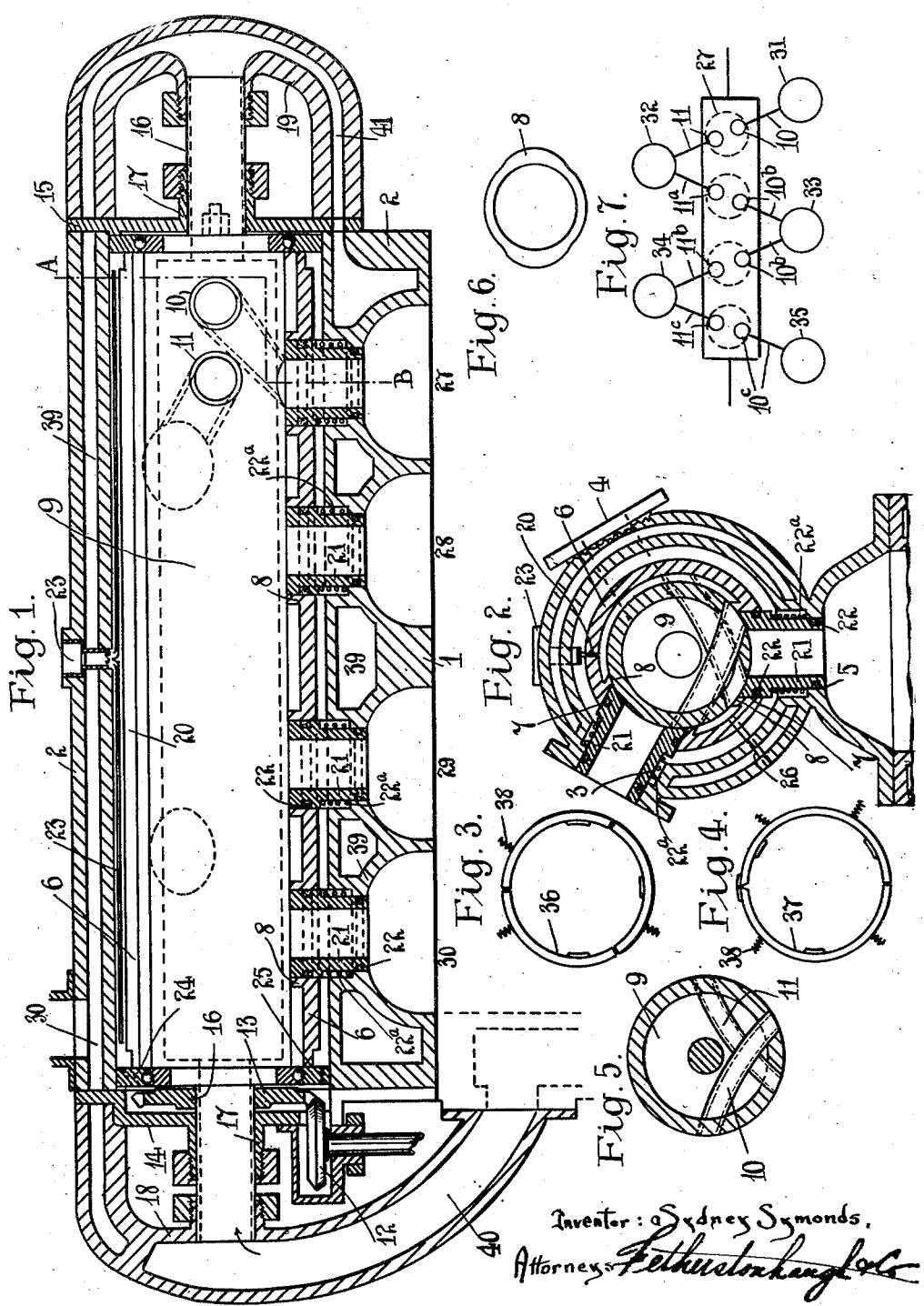
Inventor: Sydney Symonds.
Attorney Fetherstonhaugh

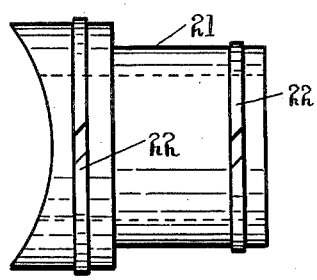
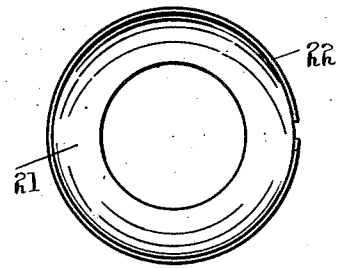
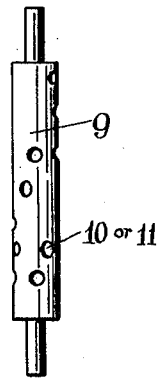
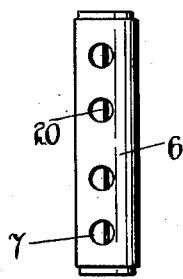

Patented May 5, 1925.

1,536,733

UNITED STATES PATENT OFFICE.

SYDNEY SYMONDS, OF WEMBLEY PARK, ENGLAND.

ROTARY VALVE.

Application filed October 29, 1924. Serial No. 746,660.

*To all whom it may concern:*

Be it known that I, SYDNEY SYMONDS, a subject of the King of Great Britain, residing at Wembley Park, Middlesex, England, have invented certain new and useful Improvements in and Relating to Rotary Valves, of which the following is a specification.

This invention relates to improvements in and relating to rotary valves, and being particularly suited to multiple-cylinder internal combustion engines, it will hereinafter be described in that application.

According to the present invention in a rotary valve of the kind having a ported valve casing and a ported cock running in a self-tightening floating sleeve or ring having ports therein, there are provided floating ferrules or bush pieces fitting in the valve casing ports and the corresponding ports in the floating sleeve or ring whereby the floating sleeve or ring is maintained in position between the valve casing and the cock.

By the present invention there is provided a rotary valve having in combination a ported valve casing, a ported cock, a self-tightening non-rotating sleeve or ring having ports therein and floating ferrules or bush pieces fitting in the valve casing ports and corresponding ports in the sleeve.

By a lay out under the present invention a balanced jacketing and more simple figuring of the cylinder are also secured.

A rotary valve according to the present invention may be in the form of a long cock having multiple sets of ports. The rotating member may be internally cooled and the valve casing externally cooled.

The non-rotating sleeve may be sectionally built up of spring urged jointed sections.

In an exemplar form of lay out according to the present invention the rotary valve is located in a detachable cylinder head.

The constructional form of valve hereinafter described and illustrated by way of example only is a rotary parallel cylindrical valve.

In the drawings, Fig. 1 is a sectional side view, Fig. 2 a sectional view on the line A—B of Fig. 1, Figs. 3 and 4 outline views of forms of non-rotating sleeves, Fig. 5 a view of a parallel cock, Fig. 6 a detail view hereinafter referred to, Fig. 7 a diagrammatic view of the connecting paths in the parallel cock between four cylinders and appropriate inlet and exhaust pipes, Fig. 8 is a side view and Fig. 9 an end view of the ferrules or bush pieces hereinafter referred to, Fig. 10 a view of the ported cock and Fig. 11 a view of the non-rotating sleeve.

Referring to Figs. 1 and 2 of the drawings which shew a four cylinder lay out, there is provided a detachable cylinder head 1 in the form of a jacketed valve casing 2 having inlet ports 3 and exhaust ports 4, and a further port 5 leading to the cylinder this latter port acting as a common inlet and exhaust port for the cylinder.

In this casing 1 is placed a valve seating sleeve or ring 6. This sleeve or ring 6 is in the form of a non-rotating floating member having ports 7 in the wall thereof facing the ports 3, 4 and 5 in the cylinder casing aforesaid.

The inner wall of the sleeve 6 has local raised valve seatings 8 surrounding the ports therein. The inner wall of the sleeve between these local rings is set back so as to provide a clearance space.

A ported parallel cock 9 having multiple sets of ports 10 and 11 rotates in the sleeve 6. This cock 9 is of hollow cylindrical form and the ports 10 and 11 are actually or virtually in the form of pipes or tubes extending across the cylindrical chamber. As shewn this rotating cock may be cooled by a circulatory water system.

A bevel drive is indicated at 12 and 13, this drive running in an oil bath.

14 and 15 are end plates secured to the casing 1.

The cock 9 has journals 16 rotating in bearings formed partly on extension 17 of the end plates 14 and 15, and partly on yoke pieces 18 and 19 carried by the end plates 14 and 15.

The valve seating sleeve or ring 6 has first a longitudinal cut or slit 20 made therein so as to impart a springiness or play thereto. The cut as shewn is perpendicular to the thickness, but the cut may be in an oblique direction or may be lapped.

The sleeve 6 is then spread open somewhat and the valve seatings are turned or machined to just fit over the rotating cylindrical member or cock 9, any suitable holding down arrangement being applied to the sleeve to keep this correctly positioned during the machining operation. The sleeve 6 when being assembled is sprung over the rotating cock 9, and the closing or contracting tension in the sleeve keeps the valve seatings closely fitting against the cock 9 and counters any leakage through wear of the wall of the cock or the bearing surfaces of the sleeve. Further contraction and expansion of the valve member is automatically compensated for.

The floating sleeve or ring 6 is maintained in position by a number of floating ferrule or bush pieces 21 having packing provisions as for example split rings 22 between their outer walls and the facing ports in the cylinder casing and valve seating sleeve or ring. Each ferrule or bush 21 is of a floating type under spring influence $22^a$ tending to preserve or promote a fluid tightness between the contacting end of the ferrule or bush and the rotating member of the valve.

It has been proposed to surround a rotary valve with a self-tightening split sleeve from which projects a fixed short pipe or like member passing into the valve casing.

Lubricant is supplied to the space between the sleeve and the valve casing by an inlet 23, and the lubricant reaches the valve seatings through the slit 20 in the sleeve or ring 6. 24 and 25 indicates passages for the lubricant to pass to the drive, and 26 indicates an outlet for the lubricant which may be provided.

The packing provision between the walls of the ferrules or bushes and the ports prevent leakage of oil from its path to the inlet and exhaust passages in the rotating member of the valve and thus to the cylinder head. In this connection Fig. 6 shews a form of elongated valve seating 8 which may be provided on the non-rotating sleeve or ring, the elongation being parallel to the longitudinal axis of the rotating ported parallel cock.

As shewn a rotary valve under the present invention may be in the form of a long distributor whereby all the cylinders of a multi-cylinder internal combustion engine are controlled by the same device.

By suitably modifying the valve, the engine could be made to run in either direction. For doing this the timing of the ignition would be appropriately altered.

Referring to Figs. 1 and 7 the four cylinders 27, 28, 29 and 30, are connected as follows. 27 to the inlet 31 by the port 10, and to the outlet 32 by the port 11. Cylinder 28 to the inlet 33 by the port $10^a$ and to the outlet 32 by the port $11^a$. Cylinder 29 to the inlet 33 by the port $10^b$ and to the outlet 34 by the port $11^b$. Cylinder 30 to the inlet 35 by the port $10^c$ and to the outlet 34 by the port $11^c$.

Fig. 3 shews a sectionally built up non-rotating sleeve 36, and Fig. 4 shews a hinged or jointed form of non-rotating sleeve 37. Both these constructions have springs 38 urging the sections to working position.

Internal cooling of the rotating member is effected by leading the cooling medium through the interior thereof. External cooling of the valve casing is effected by leading the cooling medium through the jacket 39. The yoke pieces 18 and 19 have passages 40 and 41 for circulating the cooling medium.

The valve by modifying the arrangement of ports is applicable broadly as a distributor, for example, to an air compressor or a water pump.

What I claim is:—

1. A rotary valve of the character described, comprising in combination, a valve casing having ports therein, a cock having ports therein, a self-tightening non-rotating floating sleeve having ports therein, said ported cock running in said sleeve, a drive for said cock, and floating ferrules fitting in the valve casing ports and the corresponding ports in the floating sleeve whereby the floating sleeve is maintained in position between said valve casing and said cock.

2. A rotary valve of the character described comprising in combination a valve casing having ports therein, a cock having ports therein, a self-tightening non-rotating floating sleeve having ports therein, said ported cock running in said sleeve, a drive for said cock, floating ferrules fitting in the valve casing ports and the corresponding ports in the floating sleeve whereby the floating sleeve is maintained in position between said valve casing and said cock, and springs acting on said floating ferrules tending to preserve an end-on contact between the ferrules and the said cock.

3. A rotary valve of the character described comprising in combination a valve casing having ports therein, a cock having ports therein, a self-tightening non-rotating sleeve having ports therein, said ported cock running in said sleeve, a drive for said cock, floating ferrules fitting in the valve casing ports and the corresponding ports in the floating sleeve whereby the floating sleeve is maintained in position between said valve casing, and said cock, springs acting on said floating ferrules, and a shoulder on the ferrule against which said spring bears.

4. A rotary valve of the character described comprising in combination, a valve casing having ports therein, a cock having ports therein, a self-tightening non-rotating sectionally built up floating sleeve having ports therein, said ported cock running in said sleeve, a drive for said cock, and floating ferrules fitting in the valve casing ports and the corresponding ports in the floating sleeve whereby the sectionally built up floating sleeve is maintained in position between said valve casing and said cock.

5. A rotary valve of the character described comprising in combination, a detachable cylinder head, a valve casing therein, ports in said casing, a cock having ports therein, a self-tightening non-rotating floating sleeve having ports therein, said ported cock running in said sleeve, a drive for said cock, and floating ferrules fitting in the valve casing ports and the corresponding ports in the floating sleeve whereby the floating sleeve is maintained in position between said valve casing and said cock.

6. A rotary valve of the character described comprising in combination a valve casing having ports therein, a cock having ports therein, a self-tightening non-rotating floating sleeve having ports therein, said ported cock running in said sleeve, a drive for said cock, floating ferrules fitting in the valve casing ports and the corresponding ports in the floating sleeve whereby the floating sleeve is maintained in position between said valve casing and said cock, and means for supplying lubricant to appropriate parts.

7. A rotary valve of the character described comprising in combination, a valve casing having ports therein, a cock having ports therein, a self-tightening non-rotating floating sleeve having ports therein, said ported cock running in said sleeve, a bevel drive for said cock, and floating ferrules fitting in the valve casing ports and the corresponding ports in the floating sleeve whereby the floating sleeve is maintained in position between said valve casing and said cock.

8. A rotary valve of the character described comprising in combination, a valve casing having ports therein, a cock having ports therein, a self-tightening non-rotating floating sleeve having ports therein, said ported cock running in said sleeve, a drive for said cock, floating ferrules fitting in the valve casing ports and the corresponding ports in the floating sleeve whereby the floating sleeve is maintained in position between said valve casing and said cock, and means for cooling the component parts of the valve.

9. A rotary valve of the character described comprising in combination, a valve casing having ports therein, a hollow cylindrical cock, a bevel drive for said cock, pipes extending across the cylindrical chamber of said cock and forming ports, a non-rotating sleeve having a longitudinal cut in the wall thereof, ports in said wall facing said valve casing ports, floating ferrules fitting in the valve casing ports and the corresponding ports in the sleeve whereby the sleeve is maintained in position between the valve casing and the cock, springs acting on said floating ferrules, means for supplying lubricant to appropriate parts, and means for cooling the component parts of the valve.

10. A rotary valve of the character described comprising in combination a detachable cylinder head, a valve casing therein, ports in said casing, a hollow cylindrical cock, a drive for said cock, pipes extending across the cylindrical chamber of said cock and forming ports, a non-rotating sleeve having a longitudinal cut in the wall thereof, ports in said wall facing said valve casing ports, and floating ferrules fitting in the valve casing ports and the corresponding ports in the sleeve whereby the sleeve is maintained in position between the valve casing and the cock, and means for placing the hollow cylindrical cock and the valve casing in circuit with the cooling system of the engine.

11. A rotary valve of the character described comprising in combination, a detachable cylinder head, a jacketed valve casing having inlet and exhaust ports, and a common inlet and exhaust port therein, a hollow cylindrical cock, a drive for said cock, pipes extending across the cylindrical chamber of said cock and forming ports, a non-rotating floating sleeve having a longitudinal cut therein, ports in said sleeve facing said valve casing ports, local raised valve seatings on the inner wall of said sleeve floating ferrules fitting in the valve casing ports and the corresponding ports in the sleeve whereby the sleeve is maintained in position between the valve casing and the cock, and a circulatory cooling water system.

12. A rotary valve of the character described comprising in combination, a detachable cylinder head, a valve casing having ports therein, a hollow cylindrical cock, a bevel drive for said cock pipes extending across the cylindrical chamber of said cock and forming ports, a non-rotating floating sleeve having a longitudinal cut therein, ports in said sleeve facing said valve casing ports, local raised valve seatings on the inner wall of said sleeve, floating ferrules fitting in the valve casing ports and the corresponding ports in the sleeve whereby the sleeve is maintained in position between the valve casing and the cock, a circulatory cooling water system, and means for lubricating the various parts of the valve.

In testimony whereof, I affix my signature.

SYDNEY SYMONDS.